Dec. 2, 1952 T. W. JOHNSON 2,619,889
CULTIVATOR
Filed June 19, 1947 3 Sheets-Sheet 1

Inventor:
Theodore W. Johnson,
By
Attys.

Dec. 2, 1952 — T. W. JOHNSON — 2,619,889
CULTIVATOR
Filed June 19, 1947 — 3 Sheets-Sheet 2
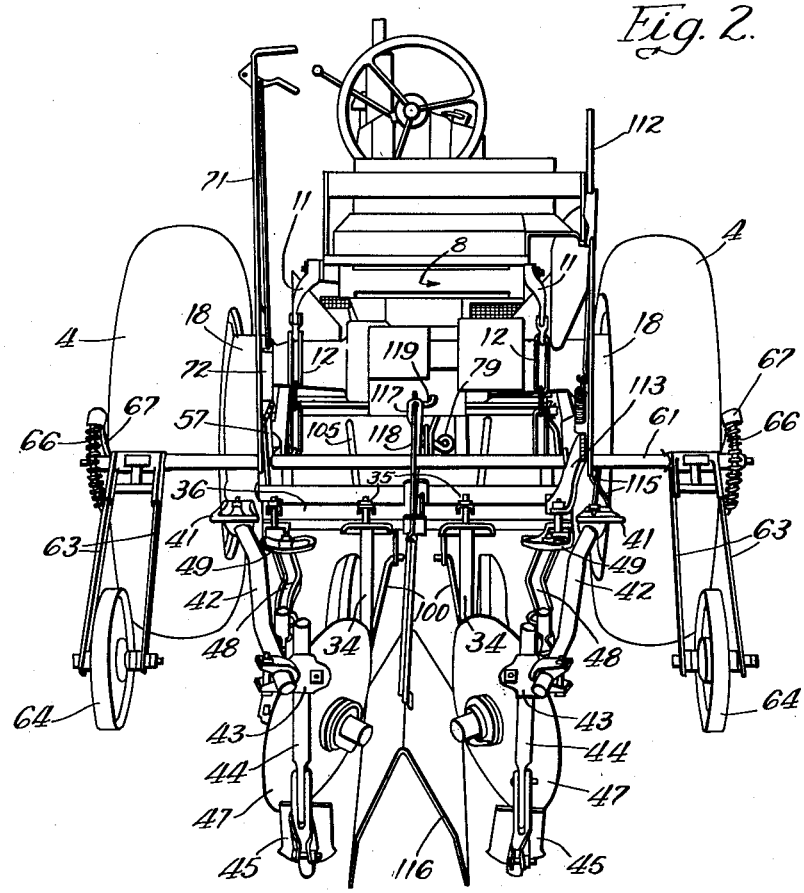
Fig. 2.

Dec. 2, 1952 T. W. JOHNSON 2,619,889
CULTIVATOR
Filed June 19, 1947 3 Sheets-Sheet 3
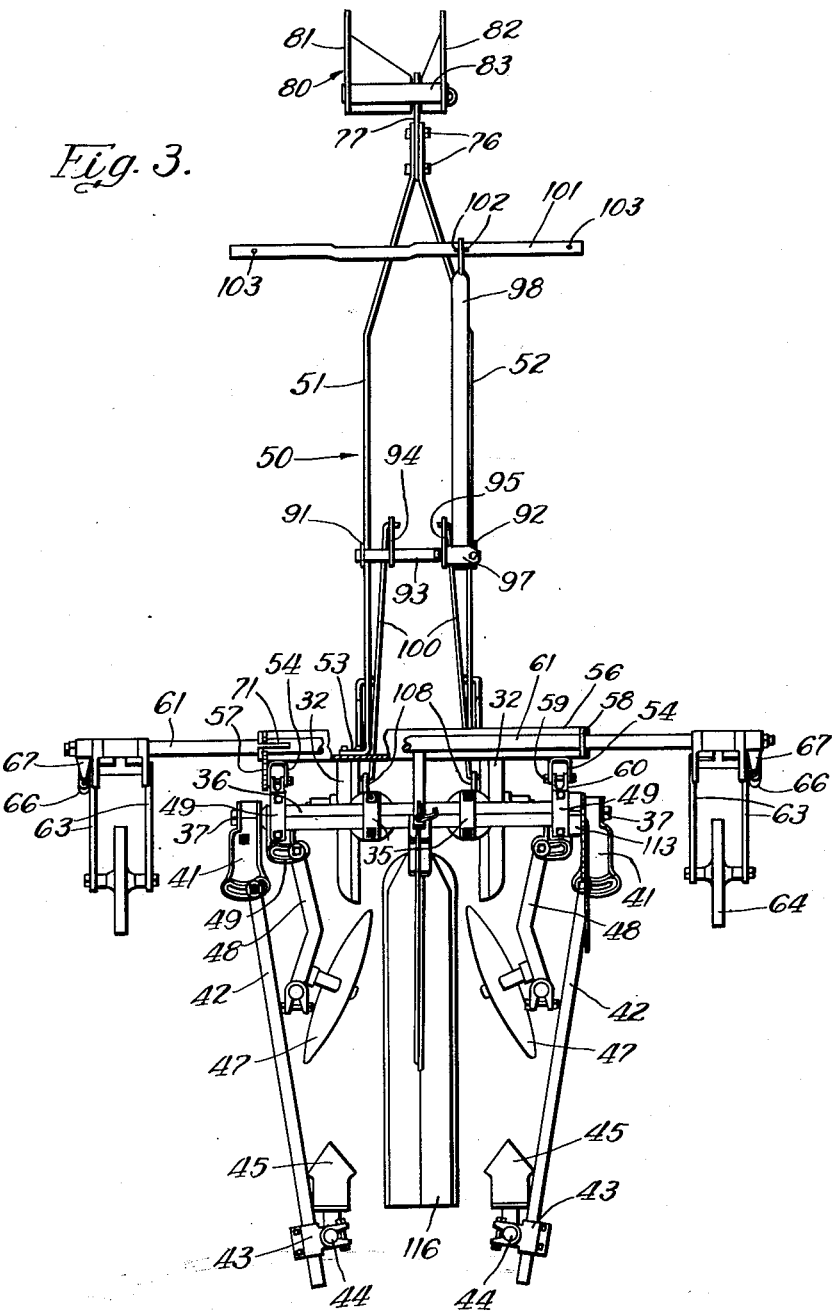
Inventor:
Theodore W. Johnson,
By
Attys.

Patented Dec. 2, 1952

2,619,889

UNITED STATES PATENT OFFICE 2,619,889

CULTIVATOR

Theodore W. Johnson, Moline, Ill., assignor to Deere & Company, Moline, Ill., a corporation of Illinois Application June 19, 1947, Serial No. 755,767

5 Claims. (Cl. 97—50)

The present invention relates generally to agricultural implements and more particularly to cultivators and similar implements adapted to be mounted on a farm tractor and propelled thereby.

The object and general nature of the present invention is the provision of a wheel supported single row lister cultivator adapted to be connected to a tractor by quick attachable means and controlled by suitable connections with the tractor. Further, it is a feature of this invention to provide a single row lister cultivator or similar implement especially adapted to be controlled as to depth of operation and raised and lowered into and out of a transport position by suitable connections with the vertically swingable power-actuated drawbar of the tractor.

Another important feature of the present invention is the provision of an agricultural implement of the type that is adapted to be hitched to a tractor having a power operated unit movable through two ranges, with connections whereby movement of said unit through one range effects an adjustment of the ground working tool means while movement through the other range provides for bodily lifting the implement and tool means out of working position.

Another important feature of the present invention is the provision of a single row listed corn cultivator adapted to be connected to a tractor having a vertically swingable power operated drawbar, in connection with raising and lowering means connected between the implement and the tractor drawbar and arranged to accommodate lateral movement of the implement relative to the drawbar while remaining in a position in which raising or lowering of the tractor drawbar serves to raise or lower the implement.

These and other objects and advantages of the present invention will be apparent to those skilled in the art after a consideration of the following detailed description, taken in conjunction with the accompanying drawings.

In the drawings:

Figure 3 is a plan view of the machine shown in Figures 1 and 2.

Figure 1:
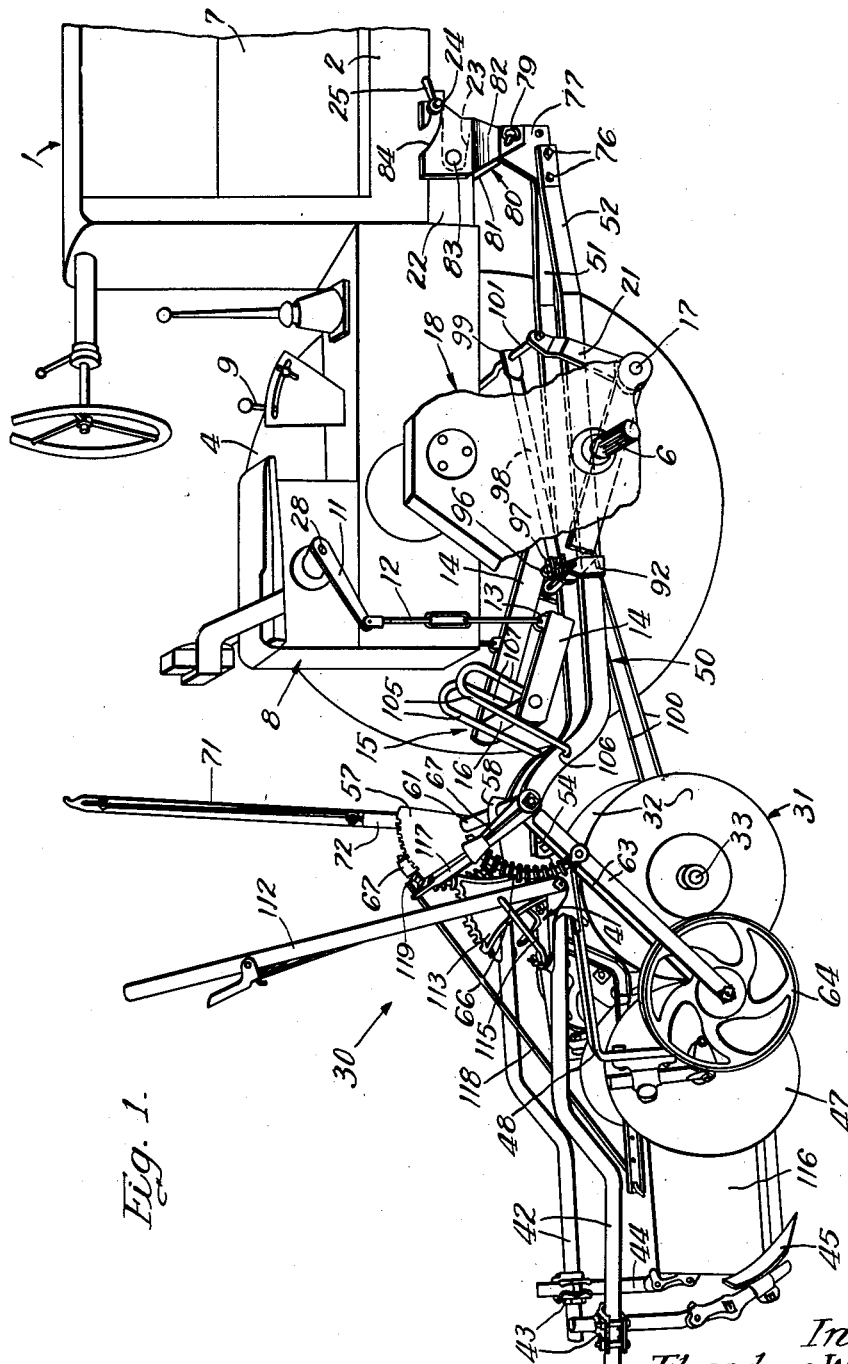
Figure 1 is a side view and Figure 2 a rear view of a tractor mounted integral listed corn cultivator in which the principles of the present invention have been incorporated.

Referring now to the drawings, particularly Figure 1, the reference numeral 1 indicates a farm tractor of the type having a generally longitudinally extending relatively narrow body 2 and supported on front wheels (not shown) and laterally spaced rear traction wheels 4 journaled for rotation in a rear axle structure in which axle shafts 6 are rotatable. The tractor 1 includes a power plant 7 and a power lift unit 8 of the hydraulic type, which includes suitable valve mechanism 9 and other parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The side members 14 may be of any suitable construction and are pivoted at their front ends, as at 17, to drop housings 18 which form a part of the tractor rear axle structure. Preferably, the rear portion 16 of the tractor drawbar is welded or otherwise permanently secured to the side members 14 of the tractor drawbar. The two power lift arms 11 are clamped or otherwise fixed in any suitable manner to the ends of a power lift rockshaft 28 which forms a part of the hydraulic power lift unit 8. Each of the tractor drawbar side members carries or is formed with an upwardly extending operating arm 21 apertured to receive connections to implements and the like.

The tractor 1 is provided with a pair of attachment plates 22, each plate member 22 having a notch 23 and carrying a stud 24 on which a wing nut 25 is mounted. The attachment plates 22 and associated parts normally form a permanent part of the tractor 1 and provide for the quick and ready attachment and detachment of implements and/or implement parts. For example, the tractor just described is adapted to receive a one-row listed corn cultivator which is indicated in its entirety by the reference numeral 30.

The implement 30, with which the present invention is more particularly concerned, comprises an implement unit which preferably takes the form of a lister cultivator gang 31 which per se is largely of conventional construction. Preferably, however, the gang 31 includes a pair of bell wheels 32 journaled for rotation on the laterally outturned ends 33 of a pair of standards 34, the upper ends of which are securely fixed, as by clamps 35, to a transverse polygonal tubular member 36 in which a shaft 37 is disposed for relative rocking movement, as on bushings carried by the tubular member 36. The ends of the shaft 37 extend laterally outwardly of the ends of the member 36 and receive a pair of tool brackets 41 to which a pair of shovel beams 42 are adjustably fixed. The rear ends of the beams 42 receive clamps 43 by which the upper ends of a pair of cultivator shanks 44 are connected thereto. Ground working shovels 45 are fixed to the lower ends of the shanks 44. Disposed forwardly of the shovels 45 is a pair of ground working disks 47. Each of the disks is rotatably mounted on suitable bearings carried by the lower portions of a disk beam 48, and the forward end of each disk beam 48 is fixed adjustably to a rearwardly extending clamping member 49 that is also carried by the square tubular member 36.

A hitch frame, indicated in its entirety by the reference numeral 50, serves to connect the lister gang 31 with the tractor 1. The hitch frame 50 comprises a pair of longitudinally extending bars 51 and 52, the rear ends of which are turned laterally outwardly, as at 53, and fixed by bolts or the like to a rear frame angle 56. The cultivator gang 31 is pivotally connected with the hitch frame bar 56 by means of a pair of brackets 54 which are fixed to the bar 56 and pivoted, as at 59, to extensions 60 on the front ends of the brackets 49.

Fixed to one end of the frame angle 56 is a notched sector 57 and fixed to the other end of the angle 56 is a bearing bracket 58. The members 57 and 58 are apertured to receive a transversely disposed rockshaft 61 that extends laterally outwardly of the lister gang 31 and carries pairs of arms 63 in the lower rear end portions of which ground wheels 64 are journaled. Preferably, the arms 63 are rockably connected with the outer end portions of the cross shaft 61 but are biased against upward movement relative thereto by arcuate springs 66 bearing at the upper ends against clamping arms 67 that are fixed to the outer ends of the shaft 61, the lower end of each of the springs 66 bearing against the associated laterally outer ground wheel arm 63. A hand lever 71 is fixed at its lower end to the shaft 61 and carries detent mechanism 72 that cooperates with the notched sector 57. Releasing the detent mechanism and swinging the hand lever 71 in one direction or the other serves to move the ground wheels 64 into different positions relative to the frame 50. The forward ends of the hitch bars 51 and 52 converge and are connected, as by bolts 76, to a hitch plate 77 and the latter is pivotally connected, as by a quick attachable hitch pin 79, to the lower portion of an attaching structure 80. The latter comprises a pair of hitch brackets 81 and 82 tied together by a cross bar 83 to which the upper portions of the brackets are fixed, as by welding. The upper marginal sections of the hitch brackets 81 and 82 are provided with slots 84 that are adapted to engage the studs 24 on the brackets 22 that are carried by the tractor, and the tie bar 83 is adapted to be seated in the sockets 23 of the tractor brackets 22. The attaching structure 80 may therefore be readily attached and detached merely by loosening the wing nuts 25 and sliding the bar 83 out of the slots 23 and the slots 84 of the bracket plates 81 and 82 away from the tractor stud bolts 24.

Mounted on the hitch bars 51 and 52 is a pair of bearing brackets 91 and 92 in which a shaft 93 is mounted for rocking movement. The shaft 93 carries a pair of downwardly and forwardly extending apertured arms 94 and 95 and one of the arms is extended upwardly, as at 96, and is apertured to receive a swivel member 97 in which the rear portion of an adjusting link or pipe member 98 is disposed. A pair of links 100 extend rearwardly from the lower ends of the arms 94 and 95 to the lower ends of the bell wheel standards 34, being pivotally connected to the latter parts by means of apertured lugs 108 (Fig. 3). The forward end of the pipe member 98 is flattened, as at 99, and apertured to receive a cross bar 101. The forward end of the link member 98 is held in place on the bar 101 by any suitable means, such as a pair of cotters 102, and the bar 101 is carried in the upper apertured ends of the tractor drawbar arms 21, being held against lateral displacement therein by any suitable means, such as a pair of quick detachable pins 103. The bar 101 may quickly be released from the tractor drawbar arms 21 by taking out one of the pins 103 sliding the bar in one direction or the other until it can be entirely released from the tractor drawbar 15. The pipe member 98 and the links 100, with associated parts, constitute generally fore-and-aft extending means for connecting the drawbar arms 21 with the lower portions of the wheel standards 34. Abutment means in the form of a pair of hook members 105 are pivotally connected, as at 106, to the hitch bars 51 and 52, and the hook portions 107 of the members 105 are so formed that when the tractor drawbar 15 is in its lowermost position, the hook members 105 may be swung forwardly until the hook portions 107 thereof are in a position to receive the transverse section 16 of the tractor drawbar 15.

When the gang unit 31 is disposed in an upright position, and the front end of the hitch frame 50 rests on the ground the hook members 105 may be swung rearwardly until they engage the outrigger shaft 61. The tractor may then be backed into position over the hitch frame 50 and the drawbar 15 lowered as it approaches the hook members 105 so that, when the drawbar is in its lowermost position, the hook members 105 may be swung forwardly so as to dispose the hook sections 107 above and just forward of the transverse bar 16 of the tractor drawbar 15. The operator then fastens the attaching structure 80 to the tractor, or in the event the latter structure was not removed, the front end of the hitch frame 50 may be connected to the attaching structure 80 by the quick attachable pin 79. Lastly, the operator inserts the cross bar 101 in the tractor drawbar arms 21, and the parts are then arranged for operation. The drawbar 15 of the tractor is then raised, the transverse section 16 passing upwardly into the hook sections 107 of the members 105, thus lifting the frame 50 and the associated lister cultivator unit into a transport position. When the field of operation is reached, the operator lowers the tractor drawbar 15 a distance sufficient to cause the tools to work at the proper depth. The depth of the tools may be adjusted whenever desired by causing the tractor drawbar 15 to be raised or lowered, which action exerts a pull or thrust through the link 98 and swings the shaft 93 in one direction or the other and thus acts through the lower links 100 to swing the standards 34 to raise or lower the tools relative to the supporting bell wheels 32. The outrigger wheels 64 serve as gauge wheels and stabilize the lister gang 31 against lateral displacement, and the amount of tension exerted by the springs 66 against the ground wheels 64 may be adjusted as desired by swinging the hand lever 71 in one direction or the other. The other hand lever 112 is utilized to raise or lower the shovels 45 relative to the disks 47. It will be noted that the hand lever 112 is pivoted to a sector-bearing extension 113 on the right hand bracket 49 and is connected by a link 115 to the right hand shovel bracket 41. A shield 116 is pivotally connected with the bar 36 and is held in different positions by a bracket 117, fixed to the angle 56, and a link 118 having an adjusting screw 119 at its forward end. It will also be noted that the hook members 105 are disposed closer together than the distance between the side arms 14 of the tractor drawbar member 15. This provides sufficient clearance to accommodate a limited amount of lateral swinging of the implement relative to the tractor, the hook sections 107 sliding laterally in one direction or the other along the transverse bar 16 of the tractor drawbar 15.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use with a tractor including a power operated, generally vertically swingable structure mounted on the tractor and having a rearwardly extending section and a forward upwardly extending section, the improvement comprising a hitch frame adapted to be connected at its forward end to the tractor forward of said swingable structure, an implement unit comprising wheels, generally vertical standards on the lower end portions of which said wheels are carried, and rearwardly disposed ground working tool means connected with said standards, means swingably connecting said unit at points adjacent the upper portions of said standards to said hitch frame, genarlly fore and aft extending motion-transmitting means adapted to be connected to the upwardly extending section of said swingable structure and operatively connected with the lower portions of said standards for rocking the latter to raise and lower said tool means, and abutment means swingably connected with said frame at a point rearwardly of said swingable structure and movable into and out of position to be engaged by the rear portion of the rearwardly extending section of said swingable structure when said rearwardly extending section is raised.

2. For use with a tractor including a power operated, generally vertically swingable structure mounted on the tractor and having a rearwardly extending section and a forward upwardly extending section, the improvement comprising a hitch frame, means for connecting the forward end of said hitch frame to the tractor, forward of said swingable structure, an implement unit comprising wheels, generally vertical standards on the lower end portions of which said wheels are carried, and rearwardly disposed ground working tool means connected with said standards, means swingably connecting said units at points adjacent the upper portions of said standards to said hitch frame, generally fore and aft extending motion-transmitting link means operatively connected with the lower portions of said standards for rocking the latter to raise and lower said tool means, means for connecting the forward end of said link means with the upwardly extending section of said swingable structure, and abutment means swingably connected with said frame at a point rearwardly of said swingable structure and movable into and out of position to be engaged by the rear portion of the rearwardly extending section of said swingable structure when said rearwardly extending section is raised, said abutment means including hook-like members pivoted to said hitch frame and swingable forwardly into a position over the rearwardly extending section of said swingable structure in its lowermost position.

3. The invention set forth in claim 2, further characterized by said hook-like members having vertically extending slots, providing a lost motion connection between said vertically swingable structure and said frame whereby the initial movement of said vertically swingable structure out of its lowermost position causes said wheel standards to be adjusted before said frame is raised.

4. For use with a tractor including a power operated, generally vertically swingable drawbar mounted on the tractor and having a rearwardly extending section, the improvement comprising an agricultural implement including a hitch frame the forward portion of which is disposable under said tractor and adapted to be connected at its forward end to the tractor forward of said swingable drawbar, means for connecting the forward end of said hitch frame with the tractor, an implement unit movably connected with said hitch frame, motion-transmitting means connected with said implement unit and adapted to be connected with said swingable drawbar to be shifted by movement of the latter, and fore and aft swingably mounted drawbar-engaging abutment means carried by said hitch frame and swingable into a position over said rearwardly extending section, said abutment means having a generally vertically slotted portion adapted to receive the rearwardly extending section of said drawbar, whereby raising the latter engages said drawbar section in said slotted portion, movement of said drawbar section within said slotted portion providing for adjustment of said implement unit relative to said hitch frame and movement of said drawbar, after the lost motion provided by said slotted portion has been taken up, providing for raising and lowering of said hitch frame.

5. For use with a tractor including a power operated, generally vertically swingable drawbar mounted on the tractor and having a rearwardly extending section, the improvement comprising an agricultural implement including a hitch frame, the forward portion of which is disposable under said tractor and adapted to be connected at its forward end to the tractor forward of said swingable structure, means for connecting the forward end of said hitch frame with the tractor, drawbar-engaging means connected with the hitch frame and extending upwardly therefrom in a position to overlie and receive the rearwardly extending section of said drawbar, when the tractor is maneuvered into position over the hitch frame, whereby raising the tractor drawbar acts through said abutment means to raise the rear end of said hitch frame, said drawbar-engaging means having slotted portions, providing a limited amount of lost motion of the drawbar relative to said hitch frame, ground-engaging tool means movably connected with said hitch frame, and motion-transmitting means for connecting said tool means with said drawbar whereby movement of the latter relative to the hitch frame through said lost motion range serves to shift said tool means relative to said hitch frame.

THEODORE W. JOHNSON.

REFERENCES CITED

The following references are of record in the file of this patent:

UNITED STATES PATENTS

| Number | Name | Date |
|---|---|---|
| 1,923,400 | Silver | Aug. 22, 1933 |
| 2,152,134 | Buhr | Mar. 28, 1939 |
| 2,171,031 | Graham et al. | Aug. 29, 1939 |
| 2,194,202 | Graham | Mar. 19, 1940 |
| 2,357,847 | Ray | Sept. 12, 1944 |
| 2,366,155 | Silver | Jan. 2, 1945 |
| 2,412,362 | Silver | Dec. 10, 1946 |
| 2,416,403 | Paul | Feb. 25, 1947 |